Nov. 29, 1960   J. W. HOLDEMAN   2,961,895
TRANSMISSION
Filed Feb. 16, 1955
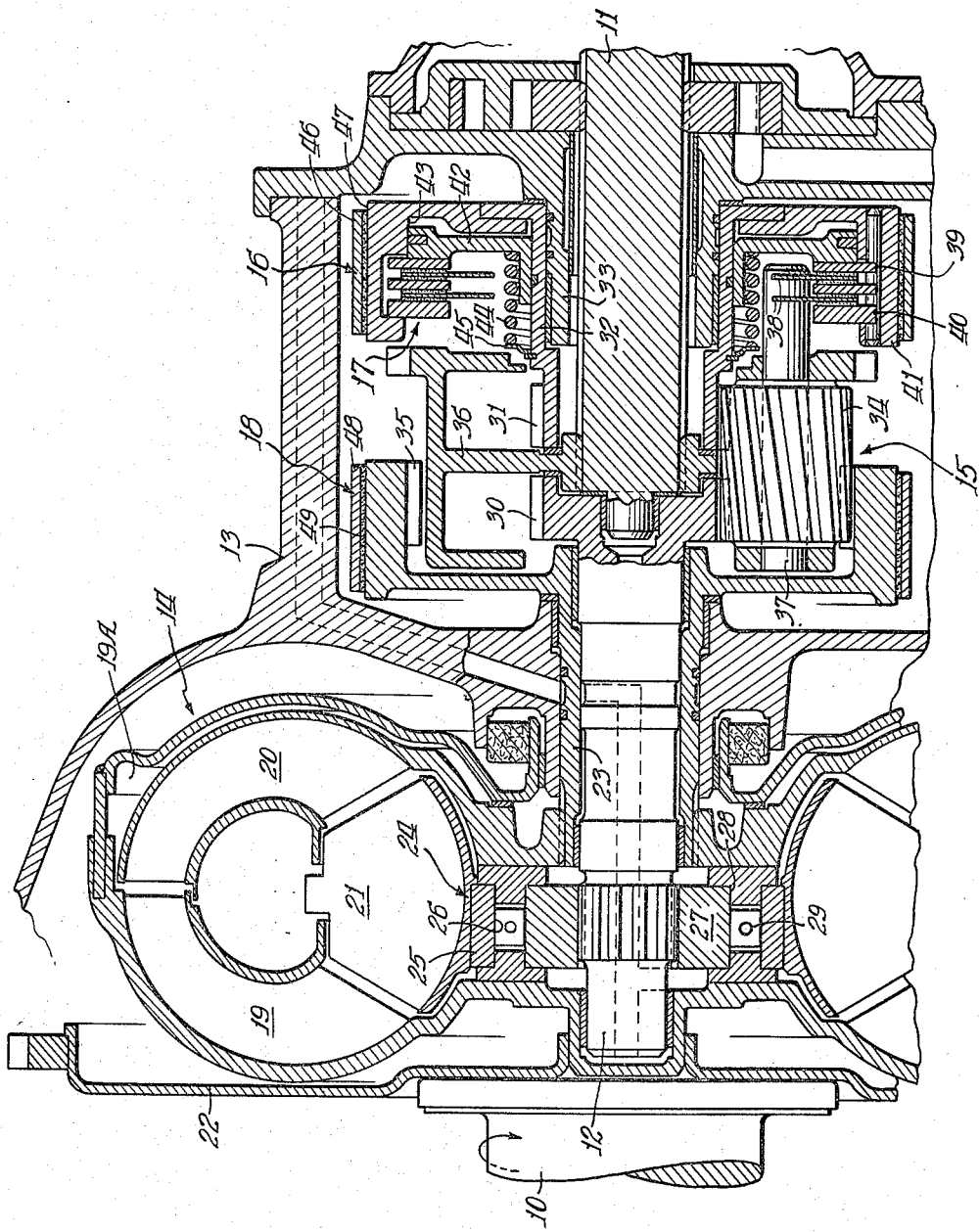
Inventor:
John W. Holdeman
By:
Keith J. Bleuer   Atty

United States Patent Office 2,961,895
Patented Nov. 29, 1960

2,961,895

TRANSMISSION

John W. Holdeman, Detroit, Mich., assignor to Borg-Warner Corporation, Chicago, Ill., a corporation of Illinois Filed Feb. 16, 1955, Ser. No. 488,509

8 Claims. (Cl. 74—677)

My invention relates to transmissions for automotive vehicles and particularly to transmissions comprising hydraulic torque converters for transmitting drive.

It is an object of the present invention to provide an improved transmission of this type which uses the reaction element of the hydraulic torque converter, and particularly the force on it in the reverse direction produced by the fluid of the hydraulic torque converter, for driving the driven shaft of the transmission in the reverse direction. A transmission of this general type, and with respect to which I consider my transmission an improvement, is shown in a patent to H. E. Carnagua, No. 2,466,206, issued April 5, 1949, and owned by the same assignee.

It is an object of the present invention to provide an improved transmission of this type which includes a planetary gear set connected in tandem with a hydraulic torque converter for providing a low speed forward drive, with the driven shaft of the transmission being driven at a torque which is the product of torque multiplication produced by the hydraulic torque converter and the planetary gear set. It is also an object to provide a clutch in connection with the planetary gear set and to so arrange the clutch with respect to the gear set and torque converter that the clutch locks the parts of the gear set together for unitary rotation and effectively connects in direct driving relationship the driven shaft of the transmission and both the reaction element and the driven element of the hydraulic torque converter, for providing a high speed forward drive in which all of the power from the drive shaft of the transmission proceeds through the hydraulic torque converter, which in this case functions as a simple two element fluid coupling. It is contemplated that in this drive, the torque converter acting as a fluid coupling allows the vehicle engine to rotate at higher speeds due to the slip in the hydraulic unit with a resultant increased engine horsepower, and the driven shaft furthermore is driven in a vibration absorbing fluid cushioned drive from the transmission drive shaft.

It is a further object of the invention to provide an improved planetary gear set in the transmission as above mentioned which although providing all of the mentioned drives nevertheless includes fewer gears than do the prior art structures, as for example that shown in the above-mentioned Carnagua patent, and which, therefore, is cheaper to manufacture.

The invention consists of the novel constructions, arrangements and devices to be hereinafter described and claimed for carrying out the above-stated objects and such other objects as will be apparent from the following description of a preferred form of the invention illustrated with reference to the accompanying drawing which shows a longitudinal, sectional view of a transmission embodying the principles of the invention.

Referring now to the drawing, the illustrated transmission comprises a drive shaft 10, a driven shaft 11, and an intermediate shaft 12 piloted with respect to the shafts 10 and 11. The shaft 10 is adapted to be driven by the engine of the vehicle in which the transmission is installed, and the shaft 11 is adapted to drive the rear road wheels of the vehicle by any suitable drive transmitting mechanism. The shafts 10 and 11 are rotatably disposed with respect to a transmission casing 13. The transmission comprises in general a hydraulic torque converter 14, a planetary gear set 15, a low speed forward drive completing friction brake 16, a high speed forward drive completing friction clutch 17, and a reverse drive completing friction brake 18.

The hydraulic torque converter 14 comprises a bladed fluid impeller 19 which provides a fluid housing 19A, a bladed runner or driven element 20 in the housing 19A and a bladed stator or reaction element 21 also in the housing 19A. The impeller 19 is connected to the drive shaft 10 to be driven thereby by means of a flywheel 22 which is fixed to both the shaft 10 and to the impeller 19. The runner 20 is splined on a sleeve shaft 23 which is rotatably disposed within the casing 13 and around the shaft 12.

A one-way engaging device 24 is provided between the stator 21 and the shaft 12. The one-way device 24 may be of conventional construction and comprises an outer sleeve 25 fixed to the stator 21 and having an inwardly facing cylindrical race surface 26, an inner hub 27 splined on the shaft 12 and having an outwardly facing cylindrical race surface 28, and tiltable sprags 29 disposed between the surfaces 26 and 28. The sprags 29 are so disposed that they grippingly engage the surfaces 26 and 28 to prevent rotation of the stator 21 in the reverse direction, that is, in the direction opposite to that in which the shaft 10 is driven from the engine of the vehicle, assuming that the shaft 12 is stationary, and the sprags 29 tilt to release the stator 21 with respect to the hub 27 and allow its free rotation in the forward direction.

The torque converter 14 is of conventional construction. Due to the action of the fluid on the blades of the members 19, 20 and 21; the runner 20 is driven initially at an increased torque with respect to that applied on the drive shaft 10, and the reaction element 21 takes the reaction for providing this increased torque. During this operation, the stator 21 is held stationary by the shaft 12 and one-way unit 24. After a predetermined speed of rotation of the runner 20 is reached, the reaction on the stator 21 at this time changes from the reverse direction to the forward direction, and the stator then rotates in the forward direction, being free for such rotation due to a releasing of the one-way unit 24. The torque converter 14 thereafter functions as a simple two element fluid coupling, and the runner 20 during this period of operation is driven at the same torque as that applied on the drive shaft 10. The reverse reaction on the stator 21 may also be utilized for driving the stator in the reverse direction and thus driving the shaft 12 in the reverse direction through the one-way unit 24 which is engaged at this time, assuming that the runner 20 is held stationary. This latter mode of operation of the stator 21 is utilized for driving the vehicle reversely as will be subsequently described.

The planetary gear set 15 comprises a sun gear 30 formed on the shaft 12, a sun gear 31 of the same size as the sun gear 30 and formed on a sleeve shaft 32 that is journalled on an annular extension 33 of the casing 13, a plurality of elongated planet gears 34 (one being shown) in mesh with both of the sun gears 30 and 31, a ring gear 35 carried by the shaft 23 and in mesh with the planet gears 34, and a planet gear carrier 36. The planet gear carrier 36 is splined on the shaft 11 and has a plurality of pinion shafts 37 extending therethrough on each of which one of the planet gears 34 is rotatably disposed.

The friction clutch 17 comprises a plurality of clutch disks 38 fitting over and thus fixed with respect to the shafts 37. The disks 38 are stacked between clutch plates 39 and an end pressure plate 40 all splined within a shell 41 which is fixed to the sleeve shaft 32. An annular piston 42 is slidably disposed in an annular cavity 43 provided in the shell 41, and the piston 42 is adapted to act on one of the plates 39 to compress the disks 38 and plates 39 and 40 together in frictional engagement. A piston return spring 44 is provided between the piston 42 and a spring retainer collar 45 fixed on the sleeve 32.

The brake 16 comprises a brake band 46 adapted to be contracted on a cylindrical drum surface 47 on the exterior of the shell 41. The brake 18 comprises a similar friction band 48 adapted to engage a cylindrical drum surface 49 on the exterior of the ring gear 35. The brake bands 46 and 48 may be contracted on their respective drums surfaces by any suitable conventional brake applying servomotors, such as those including fluid pressure operated pistons effective on one end of the friction bands.

In operation, the transmission provides a low speed forward drive completed by engagement of the brake 16, a high speed forward drive completed by engagement of the clutch 17 and a reverse drive completed by engagement of the brake 18.

The brake 16, when engaged for completing the low speed forward drive, holds the shell 41 and thereby the sleeve shaft 32 and sun gear 31 against rotation. The planet gears 34, although they planetate about the sun gears 30 and 31, function to also hold the sun gear 30 and shaft 12 against rotation. It is clear that there can be no relative rotation between the sun gears 30 and 31, since the sun gears are of equal size and any such relative rotation would produce a skewing of the planet gears 34 with respect to the sun gears 30 and 31 which is prevented by the rigid carrier 36. The brake 16 is the ultimate device taking the reaction of the torque converter stator 21, the connection from the stator to the brake being through the one-way unit 24, the shaft 12, the sun gear 30, the planet gears 34, the sun gear 31, the shaft 32 and the shell 41. The torque converter 14 on initial completion of the low speed forward drive functions to drive its runner 20 and the shaft 23 connected to the runner at an increased torque with respect to the torque impressed on the drive shaft 10. The power flows from the drive shaft 10 through the impeller 19, the runner 20, the shaft 23, the ring gear 35, the planet gears 34 and the planet gear carrier 36 to the driven shaft 11. The planet gears 34 planetate between the ring gear 35 and the sun gear 31, and the carrier 36 and driven shaft 11 are driven. The torque impressed on the shaft 11 is the product of the torque multiplications produced by the hydraulic torque converter 14 and the planetary gear set 15, since these two units are effectively connected in tandem or series. The sun gear 31 is held from rotation by the brake 16 and constitutes the reaction member of the gear set 15, so that the gear set multiplies torque. As has been previously described, when the speed of the runner 20 increases sufficiently, the runner and its output shaft 23 are driven at the same torque as the drive shaft 10; and, at this time, the torque multiplication between the shafts 10 and 11 is produced solely by the planetary gear set 15.

For high speed forward drive, the friction brake 16 is disengaged, and the clutch 17 is engaged. Engagement of the clutch 17 is obtained by applying fluid under pressure behind the piston 42 compressing the clutch disks 38 between the plates 39 and 40. The disks 38 are fixed with respect to the shafts 37 and the carrier 36; while the plates 39 and 40 are fixed with respect to the shell 41, the sleeve shaft 32 and the sun gear 31. The carrier 36 and the sun gear 31 are thus effectively locked together by means of the clutch 17, and the planetary gear set 15 as a whole rotates as a unit with no relative movement between its parts. The drive under these conditions is from the drive shaft 10 through the hydraulic torque converter 14, the sleeve shaft 23, the ring gear 35, the planet gears 34 and the planet gear carrier 36 to the driven shaft 11. The planetary gear set 15 is locked up and produces no torque multiplication, and since the sun gear 30 is connected through the sleeve shaft 23 and one-way unit 24 to the stator 21, the stator 21 rotates along with the parts of the planetary gear set 15, and the hydraulic unit 14 also does not multipliy torque. In this connection it will be observed that the locked up gear set 15 effectively connects both the runner 20 and the stator 21 with the driven shaft 11, so that the hydraulic unit 14 functions as a simple two element fluid coupling. The high speed forward drive thus is a one to one drive with no torque multiplication being produced by either the hydraulic torque converter at any speed or by the planetary gear set 15, but since all of the power from the vehicle engine passes through the fluid unit 14 acting as a fluid coupling, the drive of the driven shaft 11 is fluid cushioned with respect to the engine of the vehicle, and, due to the slip in the fluid unit 14, the engine may rotate at higher speeds than the driven shaft 11 thus producing more horsepower.

Reverse drive is obtained by engaging the brake 18. The brake 18 is effective on the ring gear 35 which is connected through the sleeve shaft 23 with the runner 20, and both the gear 35 and the runner 20 are held from rotation. For this drive, the gear 35 functions as a reaction element for the gear set 15, and the runner 20 functions as a reaction element for the hydraulic unit 14. The reaction on the stator 21 is in the reverse direction, and the stator drives the shaft 12 and gear 30 through the one-way unit 24 which is engaged for this direction of drive. The planet gears 34 are driven by the sun gear 30 and planetate within the now stationary ring gear 35, so that the carrier 36 and thereby the shaft 11 on which the carrier is splined are driven in the reverse direction. The fluid unit 14 under these conditions multiplies torque, and the planet gear set 15 also multiplies torque, so that the shaft 11 is driven in the reverse direction at an increased torque which is the product of the torque multiplication produced by the unit 14 and the torque multiplication produced by the planetary gear set 15.

My improved transmission advantageously provides a low speed forward drive power train which includes a hydraulic torque converter effectively connected in tandem with a planetary gear set both of which multiply torque, so that the driven shaft of the transmission is driven at a multiplied torque which is the product of the torque multiplications produced by the hydraulic torque converter and the planetary gear set. The transmission is so arranged that a high speed forward drive is provided in which the hydraulic torque converter now acts solely as a fluid coupling, since both the runner and reaction element of the hydraulic torque converter are effectively directly connected through the planetary gear set with the driven shaft. The hydraulic torque converter acting as a fluid coupling provides some slip, so that the driven shaft of the transmission is driven from the vehicle engine with a fluid cushioned drive; and the vehicle engine may, due to its greater speed allowed by the slip, produce a higher horsepower. The reaction on the stator of the hydraulic torque converter in the reverse direction is utilized for providing a reverse drive of the driven shaft of the transmission, the runner of the torque converter being held stationary and the stator now being allowed to rotate as the driven element of the hydraulic torque converter. The torque on the stator is subsequently multiplied by the planetary gear set which under these conditions is connected in tandem with the stator.

The planetary gear set used in this transmission, even though it has many various and diverse functions, including the multiplication of torque for the low speed forward drive, the effective connection of stator 21 with the driven shaft 11 in the high speed forward drive, the effective connection in direct drive of the driven shaft 11 with the runner 20, and a torque multiplying function for reverse drive, nevertheless, is relatively simple and includes a minimum number of gears. The planetary gear set 15 includes only the single planet gears 34, instead of planet gear pairs between sun and ring gears included in various prior art structures. Since three single or three pairs of planet gears are generally used in such planetary gear sets, a saving of two gears is obtained with the illustrated planetary gear set, the second sun gear 31 being substituted for the three extra planet gears found in prior art structures. Examples of such prior art structures may be found in the above-mentioned patent to H. E. Carnagua, No. 2,466,206. The transmission as a whole advantageously is compact and relatively economical to manufacture, considering all of the various drives and features the transmission provides.

I wish it to be understood that my invention is not to be limited to the specific constructions and arrangements shown and described, except only insofar as the claims may be so limited, as it will be understood to those skilled in the art that changes may be made without departing from the principles of the invention.

What is claimed is:

1. In a transmission, the combination of a drive shaft, a driven shaft, a hydraulic torque converter comprising a fluid impeller and a runner or driven element and a stator or reaction element which when held against unrestrained reverse rotation causes said runner to be driven at increased torque with respect to said impeller, said impeller being connected to be driven by said drive shaft, a planetary gear set having a planet gear and a planet gear carrier connected to drive said driven shaft and a plurality of gears in mesh with said planet gear, one of said plurality of gears being connected with said runner to be driven thereby, a brake for a second one of said plurality of gears for rendering this gear a reaction member for completing a low speed drive between said shafts, a third one of said plurality of gears being connected with said stator and being of the same size as the said second one of said gears so that said brake is effective for braking said stator through said planet gear whereby torque conversion takes place in said torque converter for said low speed drive, and a clutch for locking together two of the elements of said planetary gear set whereby all of the elements of the gear set rotate as a unit and said stator rotates along with and at the same speed as the elements of said gear set so that said driven shaft is driven from said drive shaft at a high speed drive through said torque converter functioning as a non-torque multiplying fluid coupling.

2. In a transmission, the combination of a drive shaft, a driven shaft, a hydraulic torque converter comprising a fluid impeller and a runner or driven element and a stator or reaction element which when held against unrestrained reverse rotation causes said runner to be driven at increased torque with respect to said impeller, said impeller being connected to be driven by said drive shaft, a planetary gear set comprising a planet gear and a planet gear carrier and a pair of sun gears in mesh with said planet gear and a ring gear in mesh with said planet gear, said ring gear being connected with said runner to be driven thereby and said carrier being connected with said driven shaft for driving the latter, a brake for one of said sun gears for causing this sun gear to act as a reaction member and complete a low speed forward drive power train between said shafts, the other of said sun gears being connected with said stator and being of the same size as said other sun gear so that said brake is also effective for holding said stator through said planet gear against rotation whereby said torque converter multiplies torque for said low speed drive, and a clutch for locking together two elements of said planetary gear set for causing the elements of said planetary gear set to rotate together as a unit and for causing said stator to rotate along with said planetary gear set elements whereby said driven shaft is driven from said drive shaft through said torque converter functioning as a non-torque multiplying fluid coupling for a high speed drive.

3. In a transmission, the combination of a drive shaft, a driven shaft, a hydraulic torque converter comprising a fluid impeller and a runner or driven element and a stator or reaction element which when held against unrestrained reverse rotation causes said runner to be driven at increased torque with respect to said impeller, said impeller being connected to be driven by said drive shaft, a planetary gear set comprising a planet gear and a planet gear carrier and a plurality of gears in mesh with said planet gear, said carrier being connected with said driven shaft for driving the latter, a first one of said plurality of gears being connected with said runner and a second one of said plurality of gears being connected with said stator for holding said stator against unrestrained reverse rotation, a brake for a third one of said plurality of gears for rendering this gear a reaction member for the planetary gear set and for completing a low speed drive between said shafts, said second and third gears being of the same size so that said brake is also effective for braking said stator through said planet gear and said torque converter is effective for multiplying torque in said low speed drive, a brake for said first one of said gears and effective for also braking said runner so that said stator is driven in the reverse direction and drives said driven shaft in the reverse direction through said planetary gear set, and a clutch for connecting together two elements of said planetary gear set for causing the elements of said planetary gear set to rotate together as a unit and for causing said stator to rotate along with said driven shaft for completing a high speed forward drive between said shafts in which said torque converter functions as a non-torque multiplying fluid coupling.

4. In a transmission, the combination of a drive shaft, a driven shaft, a hydraulic torque converter comprising a fluid impeller and a runner or driven element and a stator or reaction element which when held against unrestrained reverse rotation causes said runner to be driven at increased torque with respect to said impeller, said impeller being connected to be driven by said drive shaft, a planetary gear set comprising a planet gear and a planet gear carrier and a ring gear in mesh with said planet gear and a pair of sun gears in mesh with said planet gear, said ring gear being connected with said runner to be driven thereby and said carrier being connected with said driven shaft for driving the latter and a first one of said sun gears being connected with said stator for holding said stator against unrestrained reverse rotation, a brake for the second one of said sun gears for rendering this sun gear the reaction member of the planetary gear set for completing a low speed forward drive, said sun gears being of the same size so that said brake is also effective for braking said stator through said planet gear whereby said torque converter multiplies torque in said low speed drive, a clutch for connecting together said carrier and said second sun gear for locking up said planetary gear set so that all of its elements rotate as a unit and for effectively connecting said stator with said driven shaft for thereby completing a high speed forward drive between said shafts in which said torque converter functions as a non-torque multiplying fluid coupling, and a brake for said ring gear and thereby for said runner for causing said stator to be driven in the reverse direction and for driving said driven shaft in the reverse direction through said planetary gearing.

5. In a transmission, the combination of a drive shaft, a driven shaft, a hydraulic torque converter comprising a fluid impeller and a runner or driven element and a stator or reaction element which when held against reverse rotation causes said runner to be driven at increased torque with respect to said impeller, said impeller being connected to be driven by said drive shaft, a planetary gear set having drivingly interconnected elements, some of which are severally connected to said runner and to said stator and to said driven shaft, a brake mechanism effective for holding an element of said gear set and effective through said gear set for holding said stator against rotation for rendering said stator and said element of said gear set reaction members and rendering effective a torque multiplying low speed forward drive through said gear set between said shafts, and a clutch for locking together the elements of said gear set for unitary rotation for completing a high speed forward drive between said shafts in which said torque converter functions as a non-torque multiplying fluid coupling.

6. In a transmission, the combination of a drive shaft, a driven shaft, a hydraulic torque converter comprising a fluid impeller and a runner or driven element and a stator or reaction element which when held against reverse rotation causes said runner to be driven at increased torque with respect to said impeller, said impeller being connected to be driven by said drive shaft, a planetary gear set having drivingly interconnected elements, some of which are severally connected to said runner and said stator and said driven shaft, a brake mechanism effective for holding an element of said gear set and effective through said gear set for holding said stator against rotation for rendering said stator and said element of said gear set reaction members and rendering effective a torque multiplying low speed forward drive between said shafts, a clutch for locking together the elements of said gear set for unitary rotation for completing a high speed forward drive between said shafts in which said torque converter functions as a non-torque multiplying fluid coupling, and a brake effective for holding an element of said gear set and said runner against rotation so that said stator is driven in reverse direction and drives said driven shaft in this direction through said planetary gear set.

7. In a transmission, the combination of a drive shaft, a driven shaft, a hydraulic torque converter comprising a fluid impeller and a runner or driven element and a stator or reaction element which when held against reverse rotation causes said runner to be driven at increased torque with respect to said impeller, said impeller being connected to be driven by said drive shaft, a planetary gear set comprising a plurality of drivingly interconnected members, one of which is connected to said runner to be driven thereby and another of which is connected to said driven shaft to drive the latter, a brake for a third of said members for taking reaction of said gear set, said gear set comprising a control gear and a planet gear in mesh with said control gear and a gear meshing with said planet gear on the same side thereof as said control gear and connected with said stator whereby said brake also takes reaction from said stator through said planet gear for rendering effective a torque multiplying low speed forward drive through said torque converter to said gear set and through said gear set to said driven shaft.

8. In a transmission, the combination of a drive shaft, a driven shaft, a hydraulic torque converter comprising a fluid impeller and a runner or driven element and a stator or reaction element which when held against reverse rotation causes said runner to be driven at increased torque with respect to said impeller, said impeller being connected to be driven by said drive shaft, a planetary gear set comprising a driving member and a drive controlling member and a driven member, one of which is connected to said runner to be driven thereby and another of which is connected to said driven shaft to drive the latter, a brake for the third one of said members for taking reaction of said gear set, said gear set comprising a sun gear as said third member and a planet gear in mesh with said sun gear and a second sun gear of the same size as said first named sun gear meshing with said planet gear and connected to said stator whereby said brake also takes reaction from said stator through said planet gear and renders effective a torque multiplying forward drive through said torque converter and said gear set to said driven shaft.

References Cited in the file of this patent
UNITED STATES PATENTS

| | | |
|---|---|---|
| 2,495,515 | Foley | Jan. 24, 1950 |
| 2,498,797 | Duffield | Feb. 28, 1950 |
| 2,590,472 | Soper et al. | Mar. 25, 1952 |
| 2,695,533 | Pollard | Nov. 30, 1954 |
| 2,905,025 | Karlsson et al. | Sept. 22, 1959 |